United States Patent [19]
Newman et al.

[11] Patent Number: 5,305,149
[45] Date of Patent: Apr. 19, 1994

[54] ZOOM LENS DRIVE MECHANISM

[75] Inventors: Peter A. Newman, Rochester; William L. Burnham, Leroy, both of N.Y.

[73] Assignee: Eastman Kodak Company, Rochester, N.Y.

[21] Appl. No.: 35,004

[22] Filed: Mar. 22, 1993

[51] Int. Cl.[5] ............................................. G02B 15/14
[52] U.S. Cl. ................... 359/694; 359/814; 359/823; 354/286; 352/140
[58] Field of Search ............... 359/896, 694, 814, 823, 359/822, 703, 704, 813, 379, 376, 824; 354/286, 402; 352/140

[56] References Cited

U.S. PATENT DOCUMENTS

| | | | |
|---|---|---|---|
| 3,405,991 | 10/1968 | Seedhouse | 359/376 |
| 4,081,812 | 3/1978 | Flöther | 354/286 |
| 4,290,684 | 9/1981 | Hines | 354/286 |
| 4,291,958 | 9/1981 | Frank et al. | 354/402 |
| 4,796,974 | 1/1989 | Brakenhoff | 359/814 |
| 5,058,993 | 10/1991 | Wakugawa | 359/896 |

Primary Examiner—Loha Ben
Attorney, Agent, or Firm—Francis H. Boos

[57] ABSTRACT

A zoom lens drive mechanism, for translationally driving and positionally locating a lens subgroup of a zoom lens to a zooming position along an optical axis of the zoom lens, comprises a base ring member having an aperture concentrically defined about the optical axis of the zoom lens and a drive ring member rotatably mounted on the base member for concentric rotation about the optical axis with axial constraint. A translatable lens subgroup ring member is suspended concentrically from the base and drive ring members by means of rods independently coupled at first ends thereof to the base and drive ring members and joined at second ends thereof to a common pivot point on the translatable ring member. Alternative split ball joint arrangements are described for coupling the suspension rods to the translatable ring member.

6 Claims, 6 Drawing Sheets

ZOOM LENS DRIVE MECHANISM

FIELD OF THE INVENTION

The present invention relates to a zoom lens drive mechanism adapted to provide constrained translational movement of a lens subgroup along an optical axis of a zoom lens system.

BACKGROUND

A zoom lens system is generally comprised of multiple zooming lens groups wherein all groups must be kept aligned on the optical axis of the zoom lens system. That is to say, the lens groups must be aligned concentrically on the optical axis of the system. For zooming action each group must be independently translatable along the optical axis according to lens zoom cam data while being constrained against off-axis displacement; both laterally, in a plane orthogonal to the optical axis, as well as rotationally, through an angle deviating from the direction of the optical axis.

Zoom lens mounts using multiple sleeved barrels with pins in cam slots are well known for providing the desired constrained motion. Such zoom lens drive mechanisms are known to have problems however. For instance, in order to minimize loss of constraint on the zoom lens drive mechanism, very tight part tolerances are required on the lens barrel, the axial groove in the lens barrel, the driving pin, the cam barrel, the cam groove, and the lens subgroup. Without tight tolerances, the lens subgroup is subject to tilting or lateral deflection within the lens barrel upon application of the driving force provided by the driving pin and cam barrel. Deflection or tilting of the lens subgroup within the lens barrel is undesirable since the optical axis of the subgroup would likewise be deflected from the optical axis of the lens barrel.

It would thus be desirable to provide a zoom lens drive mechanism that reduces the need for tight tolerances on the majority of parts making up the zoom lens drive mechanism. Preferably, such a drive mechanism should minimize or eliminate the need for multiple sleeve arrangements thereby providing a more simplified and reliable zoom drive mechanism.

SUMMARY OF THE INVENTION

In accordance with the invention, there is provided a zoom lens drive mechanism for a zoom lens system wherein the drive mechanism comprises a base ring member and a drive ring member concentrically positioned about an optical axis of the zoom lens system, the drive ring member being rotatable with axial constraint relative to the base ring member. The drive mechanism of the invention further comprises a translatable lens subgroup ring member and at least three pairs of pivotable rods adapted for suspension of the translatable ring member from the base and drive ring members concentric with the optical axis. The rod pairs are equally spaced circumferentially about the ring members and each rod pair comprises first and second rods having first ends thereof pivotally coupled to the base and drive ring members and second ends thereof pivotally coupled at a generally common pivot point on the translatable ring member whereby the suspended translatable ring member is held and drivingly translated concentric with the optical axis constrained against lateral displacement and tilting rotation from the optical axis. With this arrangement a simple and reliable zoom lens driving mechanism is provided that assures relative translation between lens groups in a zoom lens system that holds the translatable lens subgroup concentric with the zoom lens optical axis both in its fixed position and while being translated along the optical axis.

DETAILED DESCRIPTION

Figure 1:
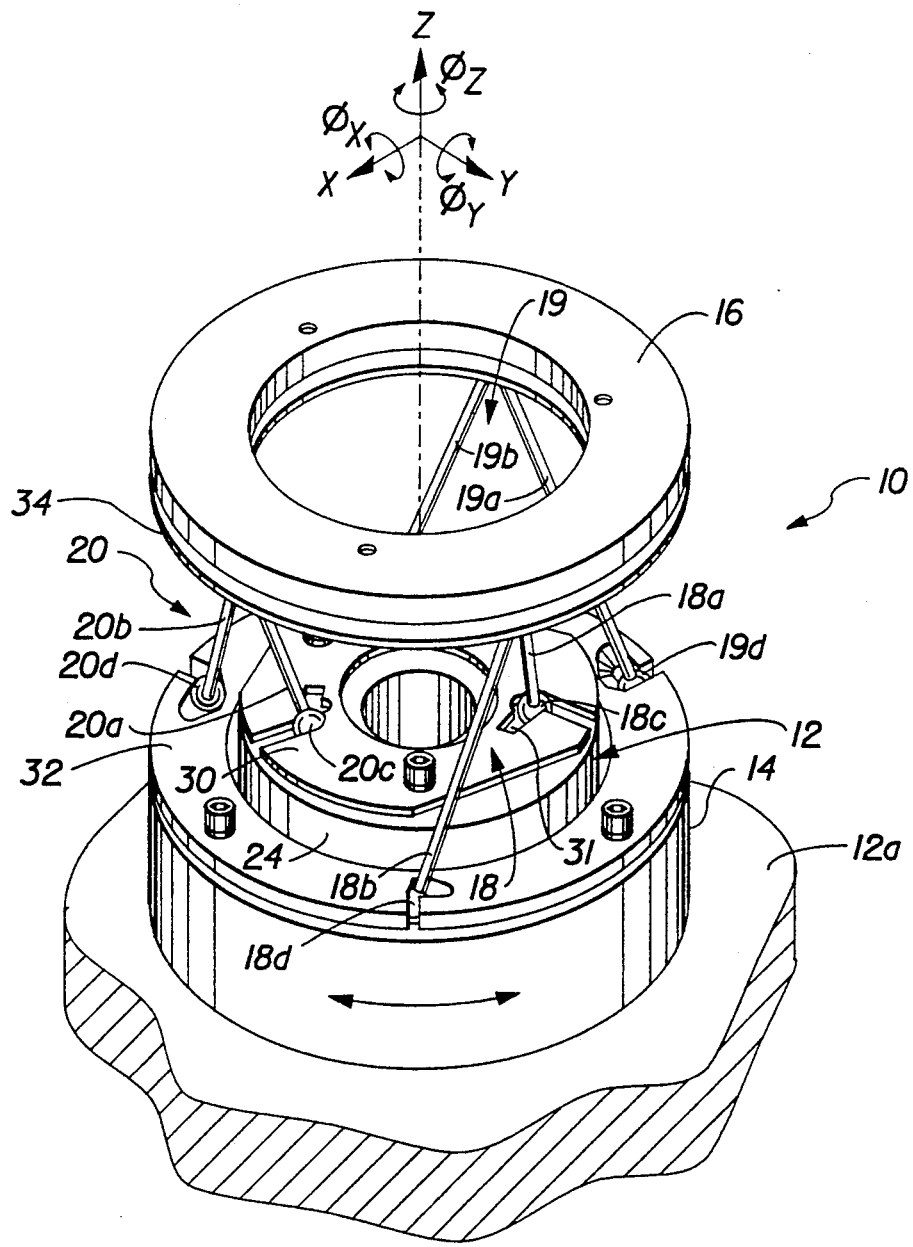
FIG. 1 is a perspective view of the zoom lens drive mechanism according to a preferred embodiment of the present invention.
Figure 2:
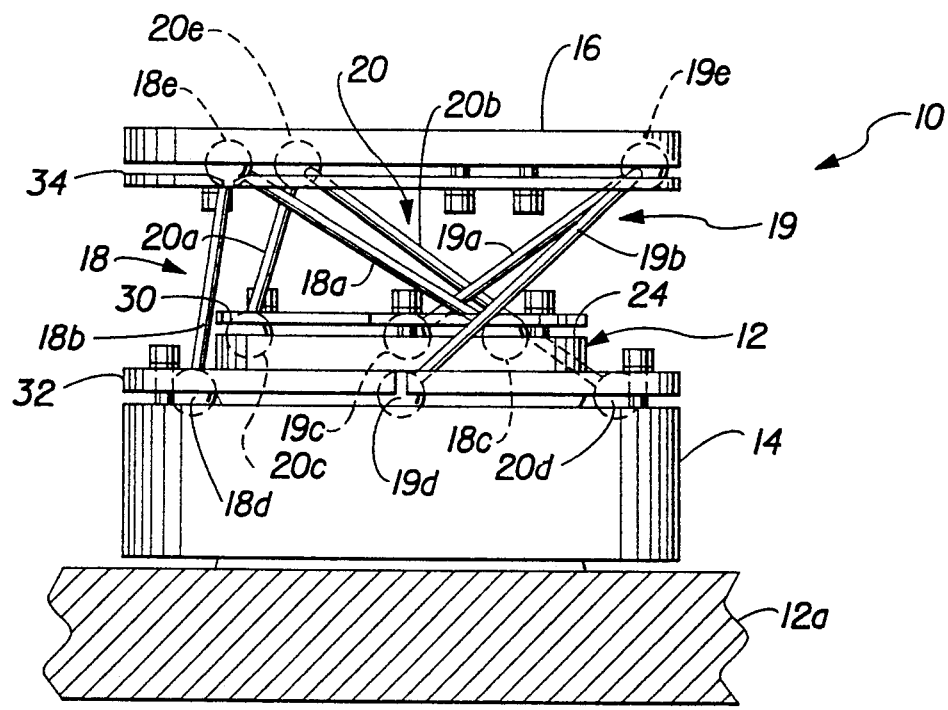
FIG. 2 is a side view of the drive mechanism of FIG. 1 shown in a retracted position.
Figure 3:
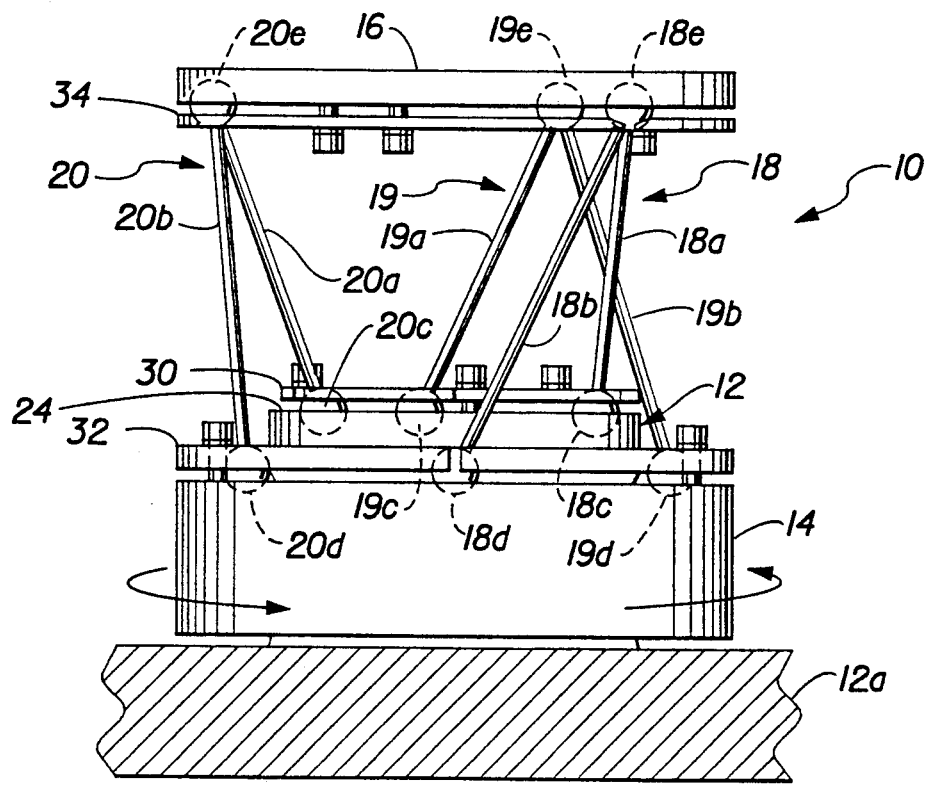
FIG. 3 is a side view of the drive mechanism of FIG. 1 shown in an extended position.
Figure 4:
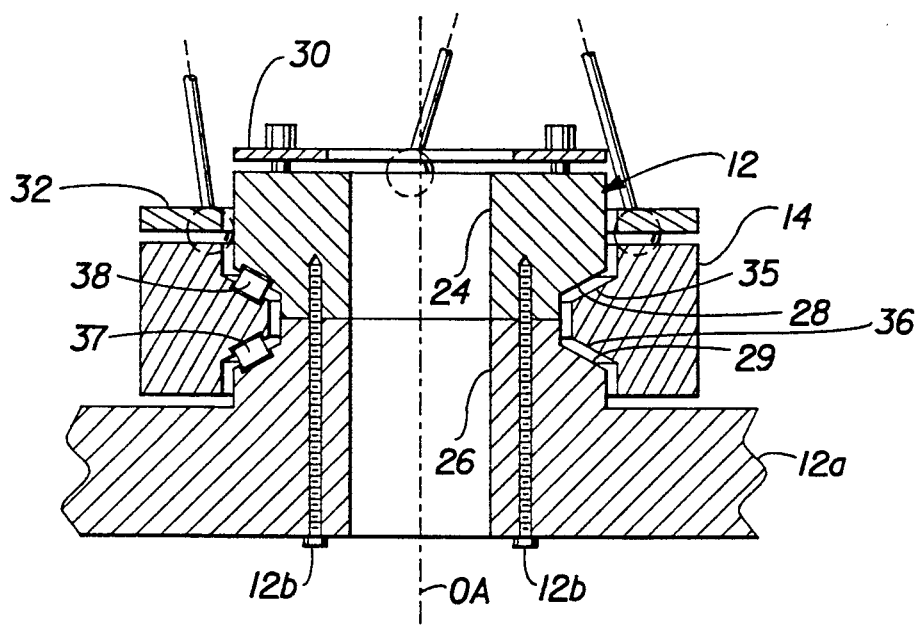
FIG. 4 is a cross-sectional side view of a portion of the drive mechanism of Fit. 1 illustrating a ring drive member rotationally mounted to a base member of the drive mechanism of FIG. 1.
Figure 5:
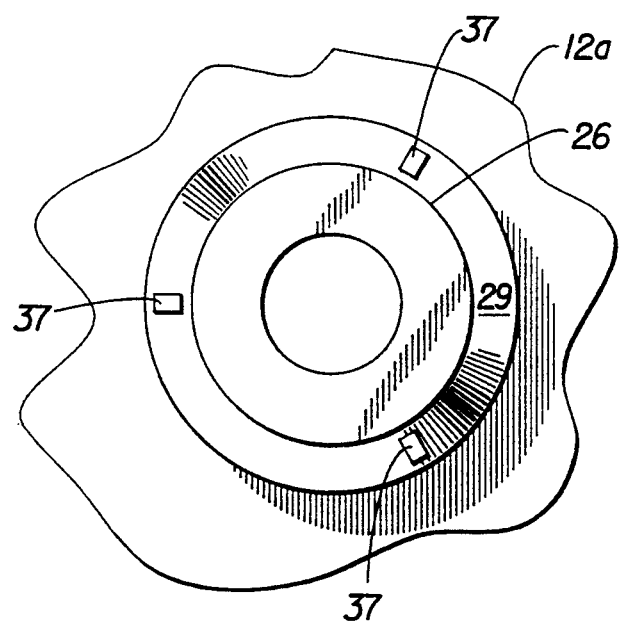
FIG. 5 is a top view of a lower portion of the base member of FIG. 4.

Referring jointly to FIGS. 1-3, a zoom lens drive mechanism 10 for a zoom lens system includes a base ring member 12 and a drive ring member 14 rotatable with axial constraint relative to each other. The rings have central apertures which are oriented concentrically about a central axis OA corresponding to an optical axis of zoom lens system in a camera. In the illustrated embodiment, base ring member 12 is held stationary by attachment to a support base 12a which might correspond to a camera body. Drive ring member 14 is rotatably mounted concentrically on the outer periphery of ring member 12. The mounting of rotatable drive ring 14 on stationary ring 12 is such as to constrain the motion of ring 14 to rotation about the central axis OA and against any other degree of freedom of motion about the central axis and, in particular, against any relative axial motion along the central axis or any tilting away from the central axis. Referring to FIGS. 4 and 5, an exemplary structure for this purpose will be described with reference to FIGS. 4 and 5. In the illustrated structure, ring 12 is split into an upper portion 24 and a lower portion 26. The facing surfaces 28 and 29 of the two portions are divergently chamfered outwardly at an approximate 30° angle from horizontal to form a groove when the two ring portions are brought together. Drive ring 14 is provided with complementary inwardly extending sloping surfaces 35 and 36 mating with the groove formed in the stationary ring 12. As seen in FIG. 5, the lower portion 26 of ring 12 is provided with three roller bearings 37 recessed in depressions equally spaced around the chamfered surface 29. one of these bearings is shown in FIG. 4. Similarly, the chamfered surface 28 of upper portion 24 of ring 12 is provided with three recessed roller bearings 38 (one of which is shown in FIG. 4). When the upper and lower portions 24, 26 are assembled and held together by means of fasteners 12b, or adhesive, with drive ring 14 in place, the bearings 37, 38 allow free rotation of ring 14 about axis OA. Preferably, at least one of the bearings is mounted with a spring loading, in known manner, to assure zero tolerance in the mounting that results in constraint of the motion of drive ring 14 against any translation along, or tilting away from, the central axis OA as it is rotated about base ring 12.

Figure 6:
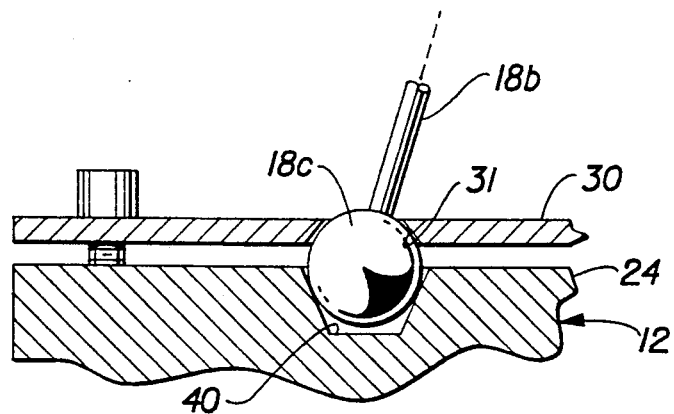
FIG. 6 is a cross-sectional view of a spherical ball joint useful in the present invention.

Referring again to FIGS. 1–3, the zoom drive mechanism includes a translatable ring member 16 and at least three pairs of pivotable rods 18, 19 and 20 adapted for suspension of the ring 16 from the base and drive ring members 12, 14 concentric with the central axis OA. The rod pairs are equally spaced circumferentially about the ring members 12, 14, 16. The rod pairs are comprised of first rods 18a–20a having first spherically shaped ends 18c–20c pivotally coupled to base ring 12 and second rods 18b–20b having spherically shaped first ends 18d–20d pivotally coupled to drive ring 14. Second ends 18e–20e of each rod pair are joined at a generally common pivot point on translatable ring 16, the pivot points for the respective rod pairs being equally spaced circumferentially about the ring 16. The spherical ends 18a–20a and 18b–20b may be comprised of balls attached to the rods or of enlarged spheres integrally formed on the rod ends. These balled ends are journalled in recesses formed in the upper surfaces of rings 12 and 14, respectively, and are retained in place by means of retainer rings 30 and 32, respectively. This can be seen more clearly with reference to FIG. 6 which illustrates, in representative manner, the coupling arrangement for one of the balled ends 18c. Thus, the lower end of rod 18b terminates in a ball 18c which is recessed in a conically shaped recess 40 of ring 12. A retaining ring late 30, having an aperture 31, is secured over ball 18c to hold the ball pivotally in place in the recess 40. A coupling of this construction results in a spherical ball joint whereby retaining ring plate 30 spring loads the ball in the recess 40 to provide a "zero tolerance" ball joint coupling.

Figure 7:
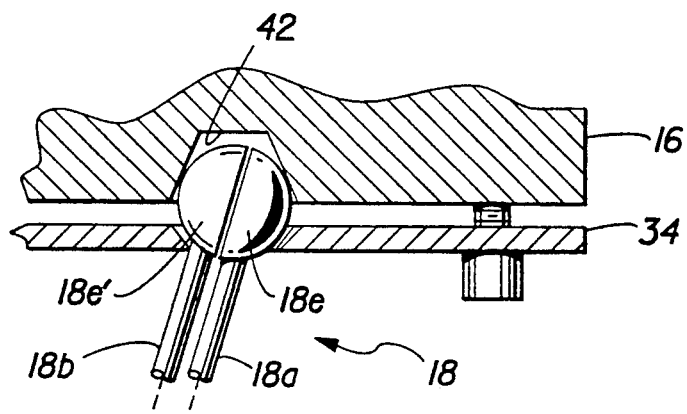
FIG. 7 is a cross-sectional view of a split spherical ball joint useful in the present invention.
Figure 8:
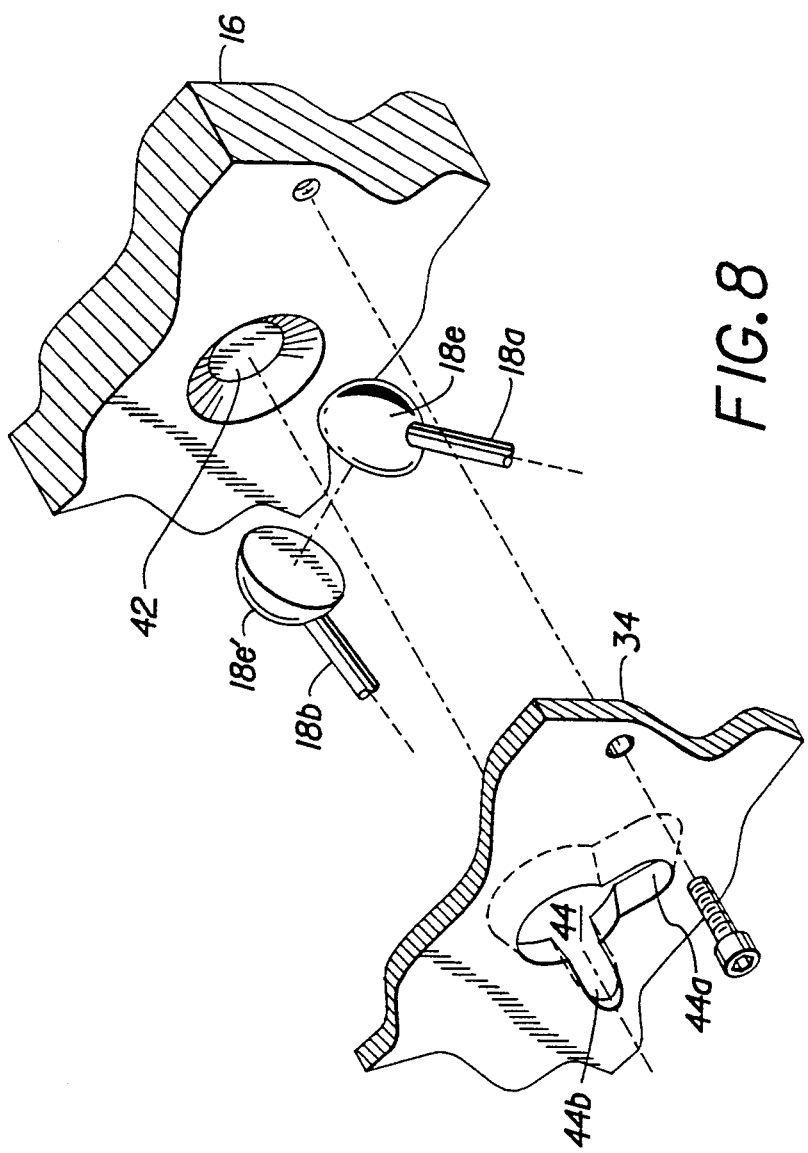
FIG. 8 is an exploded view of the split ball joint of FIG. 7.

The upper ends of the rods 18a, 18b are pivotally coupled jointly to a generally common pivot point on the lower surface of translatable ring 16. Similarly, rod pairs 19a, 19b and 20a, 20a are pivotally coupled to respective pivot points equally spaced about the circumference of the lower surface of translatable ring 16. Referring to FIGS. 7 and 8, the joint pivotal coupling arrangement for representative rod pair 18 includes a half ball 18e formed at the end of rod 18a and a complementary half ball 18e, formed at the end rod 18b. The half balls, placed side-by-side to form a split ball pivotal joint, are then captured and retained by retainer ring plate 34 in recess 42 formed in the underside of translatable ring 16. As seen in FIG. 8, the opening 44 defined by the cutout in retainer ring plate 34 is provided with relief extensions 44a and 44b to allow for free pivotal movement rods 18a and 18b, respectively, when the drive mechanism is actuated to its retracted state illustrated in FIG. 2. Similar relief extensions may be provided, as needed, in the rod openings formed in retainer ring plates 30 and 32. It will be understood that the split ball joint coupling arrangement for each of rod pairs 19 and 20 is the same as shown in FIG. 8.

Figure 9:
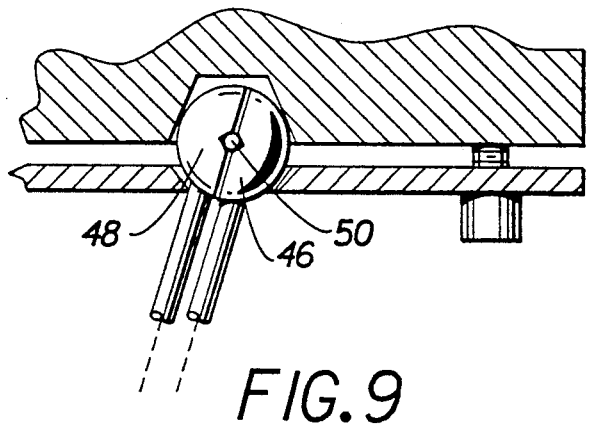
FIG. 9 is a cross-sectional view of a self-aligning split spherical ball joint alternately useful in the present invention.
Figure 10:
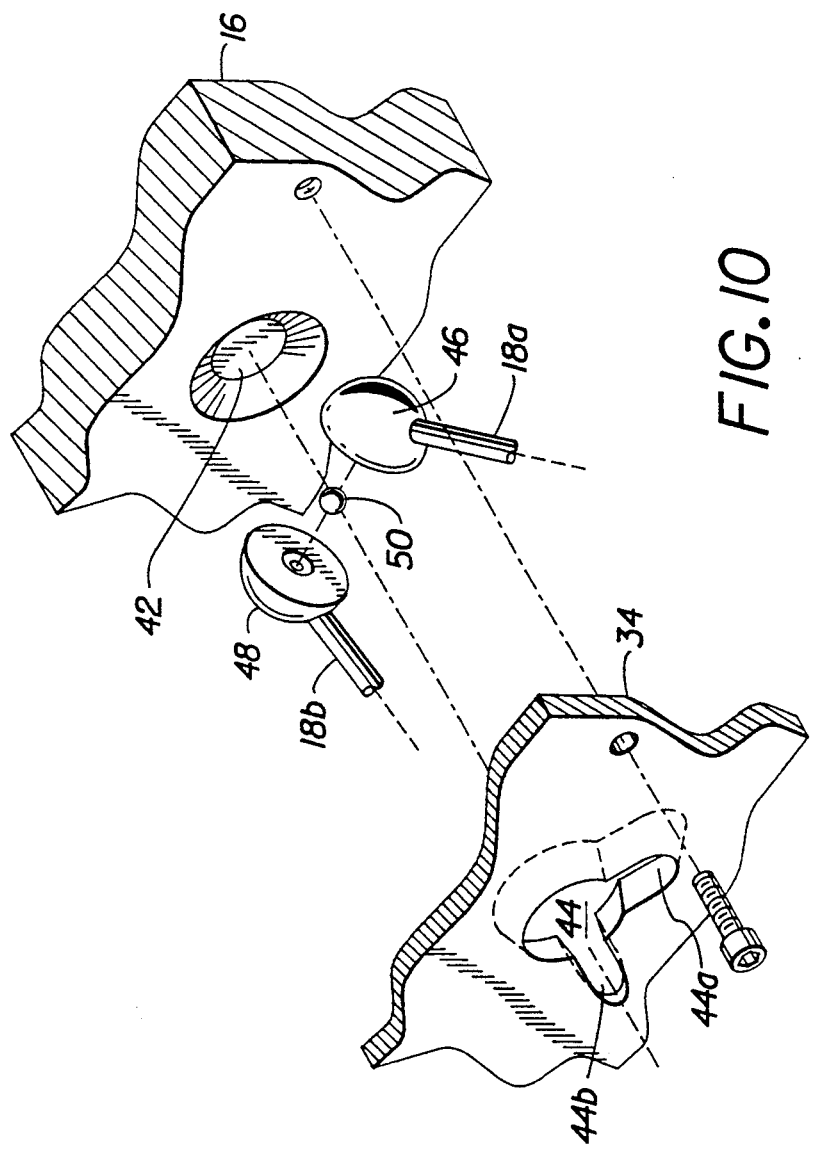
FIG. 10 is an exploded view of the self-aligning split ball joint of FIG. 9.

Referring to FIGS. 9 and 10, there is shown an improved split ball joint construction comprised of half balls 46 and 48 similar to half balls 18e, 18e, of FIG. 7. A small sphere 50 is nested in a recess formed in the center of the flat surface of each half ball and serves to maintain the two half balls of the pivotal ball joint in alignment when rods 18a, 18b are pivoted during operation of the zoom drive mechanism.

In operation, ring member 14 of zoom lens drive mechanism 10 can be rotated about central axis OA with respect to base member 12 in a clockwise or counterclockwise direction. Assuming ring 16 is initially in its retracted position as shown in FIG. 2, when ring 14 is rotated in the direction indicated by arrows in FIG. 3, ring 14 exerts a force on rods 18b–20b tending to drive ring 16 rotationally in the same direction as ring 14 about the central axis OA. The consequent pivoting action of rods 18a–20a restrains the rotation of ring 16 to a proportionate degree of rotation relative to ring 14 while at the same time constraining longitudinal motion of ring 16 to concentric translation along axis OA. Due to the previously described constraint in relative motion between rings 12 and 14, the translational motion of ring 16 along axis OA is achieved without any tilting motion (rotation) of the axis of ring 16 away from the central axis OA. Thus a stable, constrained motion of the ring 16 is achieved with the ring 16 easily and rigidly positioned anywhere along the central axis OA within the range of extension of rods 18a–20a and 18b–20b.

Referring to FIGS. 9 and 10, there is shown an improved split ball joint construction comprised of half balls 46 and 48 similar to half balls 18e, 18e, of FIG. 7. A small sphere 50 is nested in a recess formed in the center of the flat surface of each of the half balls and serves to maintain the two half balls of the pivotal ball joint in alignment when rods 18a, 18b are pivoted during operation of the zoom drive mechanism.

It will be appreciated that what has been described is a zoom lens drive mechanism that simplifies the requirements for providing parts with close tolerances. Close tolerances are requires only on the features providing constraint such as the conical bearings, rollers, conical recesses and rod balls. This is as compared with prior art zoom lens systems, particularly those based on cam driven sleeve lens mounts in which a nominal clearance is required and non-functional features of the system must be closely toleranced as well as the functional features. Moreover, the design of the present invention results in a rigid structure in which applied forces are not able to deflect the lens as compared to the prior structures which often result in a flexible structure in which applied forces cause deflection of the position of the lens.

In the accompanying drawings, the following reference numerals are used:

10: zoom lens drive mechanism
12: base ring member
12a: base member
12b: screw fasteners
14: drive ring member
16: translatable ring member
18: rod pair
19: rod pair
20: rod pair
18a–20a: first rods
18b–20b: second rods
18c–20c, 18d–20d: pivot balls
18e, 18e: split pivot balls
24: upper portion of ring 12
26: lower portion of ring 12

28: chamfered surface of upper ring portion 24
29: chamfered surface of lower ring portion 26
30: retainer ring plate
31: retainer ring plate aperture
32: retainer ring plate
34: retainer ring plate
35: sloping surface on ring 14
36: sloping surface on ring 14
37: roller bearings
38: roller bearings
40: conical recess in ring 12
42: conical recess in ring 16
44: opening in retainer ring 34
44a,44b: relief extensions in opening 44
46: split pivot balls
48: split pivot balls
50: alignment sphere The invention has been described in detail with particular reference to a presently preferred embodiment, but it will be understood that variations and modifications can be effected within the scope of the invention as set forth in the claims appended hereto.

What is claimed is:

1. A zoom lens drive mechanism for a zoom lens system having an optical axis, the drive mechanism comprising:
   a base ring member and a drive ring member concentrically positioned about the optical axis of the zoom lens system, the drive ring member being rotatable with axial constraint about the base ring member;
   a translatable lens subgroup ring member; and
   at least three pairs of pivotable rods adapted for suspension of the translatable ring member from the base and drive ring members concentric with the optical axis, each rod pair being comprised of first and second rods having first ends thereof pivotally coupled to the base and drive ring members and second ends thereof pivotally coupled at a generally common pivot point on the translatable ring member;
   whereby the suspended translatable ring member is held and drivingly translated concentric with the optical axis constrained against lateral displacement and tilting rotation from the optical axis.

2. The zoom lens drive mechanism of claim 1 in which said rod pairs are equally spaced circumferentially around said ring members.

3. The zoom lens drive mechanism of claim 1 in which:
   said base ring member comprises upper and lower portions having chamfered surfaces extending inwardly around the circumference of the ring member to form a circumferential groove;
   said rotatable ring member includes inwardly extending sloping surfaces on an inner circumference thereof complementary to the chamfered surfaces of the base ring member; and
   the mechanism further comprises friction reducing bearings mounted between said chamfered and sloping surfaces to allow free rotation of said drive ring member about said base ring member with axial constraint therebetween.

4. The zoom lens drive mechanism of claim 3 further comprising at least one of said bearings being spring loaded.

5. The zoom lens drive mechanism of claim 1 wherein for each rod pair, the first and second rods are each terminated in a half-ball shaped end, said half ball shaped ends being captured in a common pivot point whereby each of said first and second rods in a rod pair are independently pivotable in opposite directions.

6. The zoom lens drive mechanism of claim 5 in which said half-ball shaped ends include planar surfaces facing each other and further include relatively small depressions at the center of each said planar surface in which there is provided a small sphere to maintain alignment of said half-ball shaped ends at said pivot point during pivoting of said first and second rods.

* * * * *